(12) United States Patent
Chen

(10) Patent No.: US 12,656,891 B2
(45) Date of Patent: Jun. 16, 2026

(54) DYNAMICALLY CONTROLLED ACTIVE STYLUS AND DYNAMICAL STYLUS CONTROL METHOD

(71) Applicant: SILICON INTEGRATED SYSTEMS CORP., Hsinchu City (TW)

(72) Inventor: Han-Ning Chen, Hsinchu City (TW)

(73) Assignee: SILICON INTEGRATED SYSTEMS CORP., Hsinchu City (TW)

(*) Notice: Subject to any disclaimer, the term of this patent is extended or adjusted under 35 U.S.C. 154(b) by 0 days.

(21) Appl. No.: 19/084,146

(22) Filed: Mar. 19, 2025

(65) Prior Publication Data

US 2025/0298474 A1 Sep. 25, 2025

(30) Foreign Application Priority Data

Mar. 21, 2024 (TW) ................................. 113110584

(51) Int. Cl.
*G06F 3/038* (2013.01)
*G06F 3/0354* (2013.01)

(52) U.S. Cl.
CPC ........ *G06F 3/0383* (2013.01); *G06F 3/03545* (2013.01)

(58) Field of Classification Search
CPC ............................ G06F 3/0383; G06F 3/03545
See application file for complete search history.

(56) References Cited

U.S. PATENT DOCUMENTS

| | | | |
|---|---|---|---|
| 9,087,471 B2 * | 7/2015 | Miao | ...................... G09G 3/003 |
| 9,671,877 B2 * | 6/2017 | Zerayohannes | ..... G06F 3/03545 |
| 9,817,533 B2 | 11/2017 | Bulea | |
| 10,082,889 B2 * | 9/2018 | Sundara-Rajan | ... G06F 3/03545 |
| 10,216,330 B2 | 2/2019 | Vavra | |
| 10,437,358 B2 | 10/2019 | Geaghan | |
| 2002/0188952 A1 * | 12/2002 | Istvan | ................ H04N 21/6581 348/E7.071 |

(Continued)

FOREIGN PATENT DOCUMENTS

| | | |
|---|---|---|
| CN | 107256104 B | 3/2020 |
| TW | 201614449 A | 4/2016 |

(Continued)

OTHER PUBLICATIONS

Taiwan Office Action dated Oct. 1, 2025 as received in application No. 113110584.

(Continued)

*Primary Examiner* — Sejoon Ahn
(74) *Attorney, Agent, or Firm* — Maschoff Brennan

(57) ABSTRACT

A dynamically controlled active stylus and dynamical stylus control method are provided. The dynamical stylus control method for dynamically controlling active stylus operates through the dynamical controlled active stylus. The dynamical controlled active stylus includes a tip electrode, a shielding electrode, a ring electrode, and a dynamic module. The control method for dynamically controlling stylus includes: controlling the active stylus to be in a receiving state within a frame of operation of the active stylus, such that the shielding electrode is at a floating potential, and controlling the active stylus to be in a transmitting state within the frame of operation of the active stylus such that the shielding electrode is at a ground potential.

12 Claims, 7 Drawing Sheets

(56)　　　　References Cited

U.S. PATENT DOCUMENTS

| | | | | |
|---|---|---|---|---|
| 2003/0214490 A1* | 11/2003 | Cool | ................... | G06F 3/03545 |
| | | | | 345/179 |
| 2004/0032758 A1* | 2/2004 | Cheng | ................... | G11C 15/00 |
| | | | | 365/49.17 |
| 2005/0110777 A1* | 5/2005 | Geaghan | ................ | G06F 3/042 |
| | | | | 345/179 |
| 2005/0190639 A1* | 9/2005 | Hu | ......................... | G11C 15/04 |
| | | | | 365/232 |
| 2005/0191554 A1* | 9/2005 | Soga | ................... | H01M 4/133 |
| | | | | 423/445 B |
| 2006/0262106 A1* | 11/2006 | Suk | ...................... | G06F 1/1626 |
| | | | | 345/179 |
| 2006/0267948 A1* | 11/2006 | Takahashi | ........... | G02F 1/13338 |
| | | | | 349/12 |
| 2008/0169132 A1* | 7/2008 | Ding | ................... | G06F 3/04162 |
| | | | | 178/19.02 |
| 2014/0333852 A1* | 11/2014 | Ishikawa | ............. | G02F 1/13338 |
| | | | | 349/12 |
| 2015/0070330 A1* | 3/2015 | Stern | ................... | G06F 3/0442 |
| | | | | 345/179 |
| 2015/0116289 A1* | 4/2015 | Stern | ................... | G06F 3/03545 |
| | | | | 345/179 |
| 2016/0155242 A1* | 6/2016 | Bean | ................... | G06T 15/503 |
| | | | | 345/592 |
| 2016/0162051 A1* | 6/2016 | Peretz | ................... | G06F 3/0442 |
| | | | | 345/179 |
| 2016/0246390 A1* | 8/2016 | Lukanc | ............... | G06F 3/04162 |
| 2016/0320895 A1* | 11/2016 | Ribeiro | ............... | G06F 3/04162 |
| 2017/0045962 A1* | 2/2017 | Stern | ................... | G06F 3/0383 |
| 2017/0076798 A1* | 3/2017 | Puckett | ................. | G11C 15/04 |
| 2017/0205913 A1* | 7/2017 | Kimura | .............. | G06F 3/04164 |
| 2017/0255295 A1* | 9/2017 | Tanemura | ............ | G06F 1/3262 |
| 2017/0262122 A1* | 9/2017 | Chang | ................ | G06F 3/04166 |
| 2018/0107301 A1* | 4/2018 | Kimura | ............... | H10D 86/441 |
| 2018/0314349 A1* | 11/2018 | Jiang | ................... | G06F 3/03545 |
| 2018/0321788 A1* | 11/2018 | Kimura | .............. | G02F 1/13306 |
| 2019/0235647 A1* | 8/2019 | Chang | .................... | G06F 3/044 |
| 2020/0033958 A1* | 1/2020 | Yamamoto | ........... | G06F 3/0446 |
| 2025/0390190 A1* | 12/2025 | Bok | ...................... | G06F 3/0442 |

FOREIGN PATENT DOCUMENTS

| | | |
|---|---|---|
| TW | 201617799 A | 5/2016 |
| TW | 201734722 A | 10/2017 |

OTHER PUBLICATIONS

Taiwan Office Action dated Feb. 3, 2025 as received in application No. 113110584.

* cited by examiner

S10

S20

DYNAMICALLY CONTROLLED ACTIVE STYLUS AND DYNAMICAL STYLUS CONTROL METHOD

CROSS REFERENCE TO RELATED APPLICATIONS

The present application claims priority of the Taiwan Patent Application No. 113110584, filed on Mar. 21, 2024 with the Taiwan Intellectual Property Office, which is incorporated by reference in the present application in its entirety.

FIELD OF INVENTION

The present application relates to a dynamically controlled active stylus and a dynamical stylus control method thereof, and more particularly to a dynamically controlled active stylus and control method thereof for dynamically switching the electrical potential state of internal electrodes in each frame of operation.

BACKGROUND OF INVENTION

A digitizer is an electronic device that allows a user to use a stylus or finger to convert handwriting or drawing movements into digital signals. It contains at least one sensing area and is widely used in graphic design, digital art, computer-aided design (CAD), handwriting input, architectural design, interior design and other fields.

The current stylus usually has a plurality of electrodes for transmitting or receiving signals at different time points in each frame, so that the digitizer is enabled to sense the relative operating position and tilt angle of the stylus on the digitizer. However, although increasing the volume of the electrode can enhance clarity of the signal received by the digitizer, the enlarged volume of the electrode will also cause a position and a tilt angle of the stylus sensed by the digitizer to become inaccurate.

In addition, since the time of each frame of the stylus in actual operation is very short, even less than 20 ms, the inaccuracy of the signal transmission of the electrode will greatly reduce the performance and user experience of the stylus. In addition, under the current trend of pursuing precision design, the electronic components in the stylus are miniaturized, so that the positions of the plurality of electrodes are correspondingly more concentrated, resulting in a more serious problem of mutual interference between electrodes.

In view of this, it is necessary to provide a dynamic controlled stylus and a dynamically stylus control method to solve the above technical problems.

SUMMARY OF INVENTION

In order to solve the above-mentioned problems of the prior art, a purpose of the present application is to provide a dynamically control method for an active stylus and its control system, which addresses the issue of positional and angular sensing inaccuracies during the operation of existing styluses. It also aims to prevent signal interference caused by the centralized placement of electronic components in the active stylus while enhancing the signal reception and positioning capabilities between the digitizer and the active stylus.

In a first aspect, the present application provides a dynamical stylus control method operated through an active stylus, wherein the active stylus includes a tip electrode, a shielding electrode surrounding a portion of the tip electrode, a ring electrode farther away from the tip electrode and surrounds a portion of the shielding electrode, and a dynamic module connected to the shielding electrode and configured to dynamically switch an electrical potential state of the shielding electrode, and wherein the dynamical stylus control method comprises: in a frame of operation of the active stylus, controlling the active stylus to be in a receiving state wherein the electrical potential state of the shielding electrode is maintained in a floating potential; and in the frame of operation of the active stylus, controlling the active stylus to enter a transmitting state wherein the electrical potential state of the shielding electrode is maintained in a ground potential.

In some embodiments of the present application, the dynamic module is also connected to the tip electrode, and wherein the dynamic module controls the electrical potential state of the tip electrode to be in the floating potential or the ground potential when the active stylus is in the receiving state.

In some embodiments of the present application, further includes resetting the stylus before the step of controlling the active stylus to be in the receiving state such that the electrical potential state of the shielding electrode is maintained in the floating potential.

In some embodiments of the present application, further comprising verifying whether the active stylus has received a beacon from outside before the step of controlling the active stylus to be in the transmitting state such that the electrical potential state of the shielding electrode is maintained in the ground potential.

In some embodiments of the present application, after the step of controlling the active stylus to be in the transmitting state such that the electrical potential state of the shielding electrode is in the ground potential, the method further includes: verifying whether the frame of operation of the active stylus is ended; allowing the active stylus to continue to be in the transmitting state when the frame has not yet ended; and switching the active stylus to the receiving state when the frame is ended.

In a second aspect, the present application also provides a dynamically control active stylus, including: a main body; a conical portion comprising a bottom portion and a top portion, wherein the bottom portion is connected to the main body, and wherein the bottom portion comprises a larger cross-sectional area than the top portion; a tip electrode protruding from inside of the conical portion to be outside of the top portion of the conical portion; a shielding electrode surrounding a portion of the tip electrode within the conical portion; a ring electrode surrounding a portion of the shielding electrode located away from the tip electrode; and a dynamic module disposed in the active stylus, wherein the dynamic module is configured to dynamically switch the electrical potential state of the shielding electrode when the active stylus is in operation; wherein the dynamic module controls the electrical potential state of the shielding electrode to be in a floating potential when the active stylus is in a receiving state; and wherein the dynamic module controls the electrical potential state of the shielding electrode to be in a ground potential when the stylus enters a transmitting state.

In some embodiments of the present application, the dynamic module is disposed in the main body and is connected to the tip electrode, the shielding electrode, and the ring electrode, respectively.

In some embodiments of the present application, the electrical potential state of the tip electrode is in the floating potential or the ground potential when the stylus is in the receiving state.

In a third aspect, the present application also provides a dynamically controlled active stylus, comprising: a main body; a conical portion comprising a bottom portion and a top portion, wherein the bottom portion of the conical portion comprises a larger cross-sectional area than the top portion, and wherein the bottom portion of the conical portion is connected to the main body; and a tip portion protruding from inside of the conical portion to be outside of the top portion of the conical portion, the pointed end portion including; a tip electrode positioned at the tip portion away from an end of the conical portion; a shielding electrode connected to a portion of the tip electrode away from the end of the conical portion; and a ring electrode connected to a portion of the shielding electrode away from the tip electrode; wherein the active stylus further comprises a dynamic module, the dynamic module is configured to switch an electrically state of the shielding electrode according to an beacon, wherein the dynamic module control the electrical potential state of the shielding electrode to be in a floating potential when the active stylus is in a receiving state; and the active stylus enters to an transmitting state when the active stylus receives the beacon, wherein the dynamic module controls the electrical potential state of the shielding electrode to be in a ground potential.

In some embodiments of the present application, the dynamic module is disposed in the main body and is respectively connected to the tip electrode, the shielding electrode, and the ring electrode.

In some embodiments of the present application, the conical portion further comprises a first contact portion for connecting to the tip electrode, a second contact portion for connecting to the shielding electrode, and a third contact portion for connecting to the ring electrode; wherein the tip portion can be detachably inserted into the conical portion and connected to the conical portion, and wherein when the tip portion is inserted into the conical portion, the first contact portion contacts the tip electrode, the second contact portion contacts the shielding electrode, and the third contact portion contacts the ring electrode.

In some embodiments of the present application, the electrical potential state of the tip electrode is at the floating potential or the ground potential when the active stylus is in the receiving state.

Compared with the prior art, the present application provides a dynamically controlled active stylus and a dynamical stylus control method, which is provided by setting a shielding electrode between the ring electrode and the tip electrode, and in each frame of the stylus operation, the electrical potential state of the shielding electrode is switched between the ground potential and the floating potential as the receiving state and the transmitting state are different, which precisely enhance the positioning capability of the digitizer and avoid the technical problem of poor signal reception of the active pen caused by the tip electrode and the ring electrode being too small.

The following is a detailed description of the specific embodiments in conjunction with the attached figures, which will make it easier to understand the purpose, technical content, characteristics and effects achieved by the present application.

DETAILED DESCRIPTION OF PREFERRED EMBODIMENTS

Figure 1:
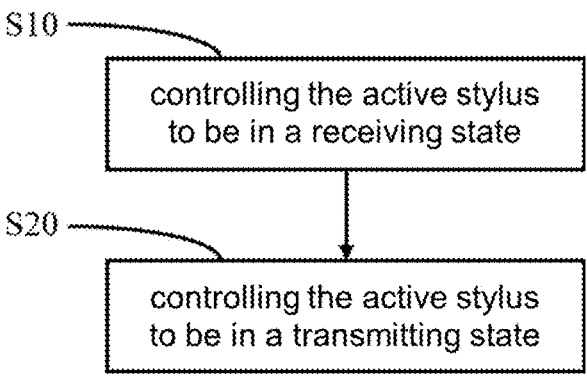
FIG. 1 is a flow chart of a dynamical stylus control method according to one embodiment of the present application.

The following will be combined with the figures in the embodiments of the present application to clearly and completely describe the technical solutions in the embodiments of the present application. Obviously, the described embodiments are only part of the embodiments of the present application, rather than all the embodiments. In addition, it should be understood that the specific embodiments described herein are only used to illustrate and explain the present application, and are not used to limit the present application. Referring to the figures, wherein the same reference numerals represent the same elements.

Referring to FIG. 1, the present application uses process S10: controlling the active stylus to be in a receiving state, and process S20: controlling the active stylus to be in a transmitting state, to precisely enhance a positioning capability of the digitizer and avoid the technical problem of poor signal reception of the active stylus caused by the tip electrode and the ring electrode being too small. The process S10 and the process S20 may be different stages of a same frame operation of the active stylus operation. The following paragraphs will sequentially describe the detailed features of the present application.

Figure 2:
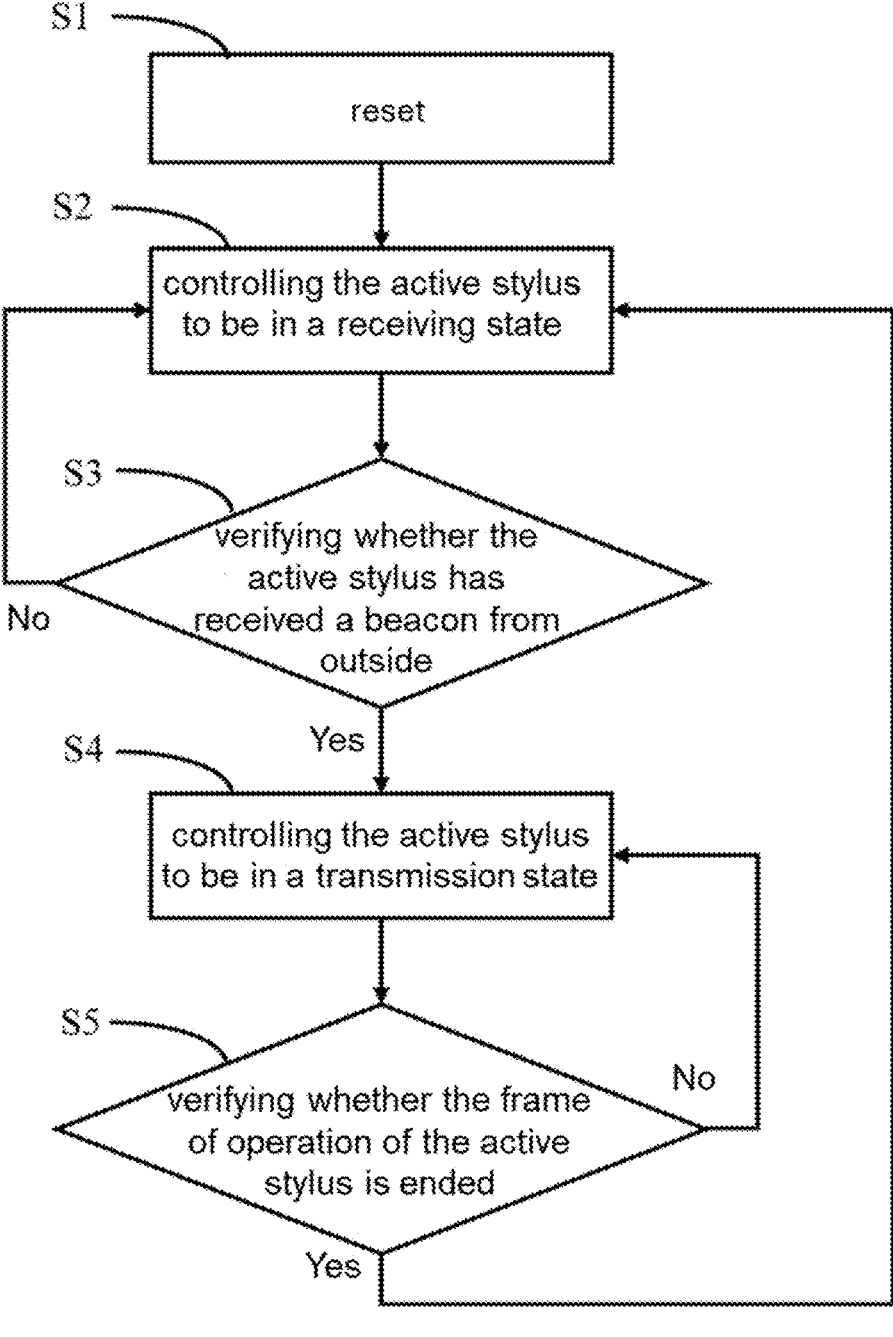
FIG. 2 is a flow chart of a dynamical stylus control method according to one embodiment of the present application.
Figure 3:
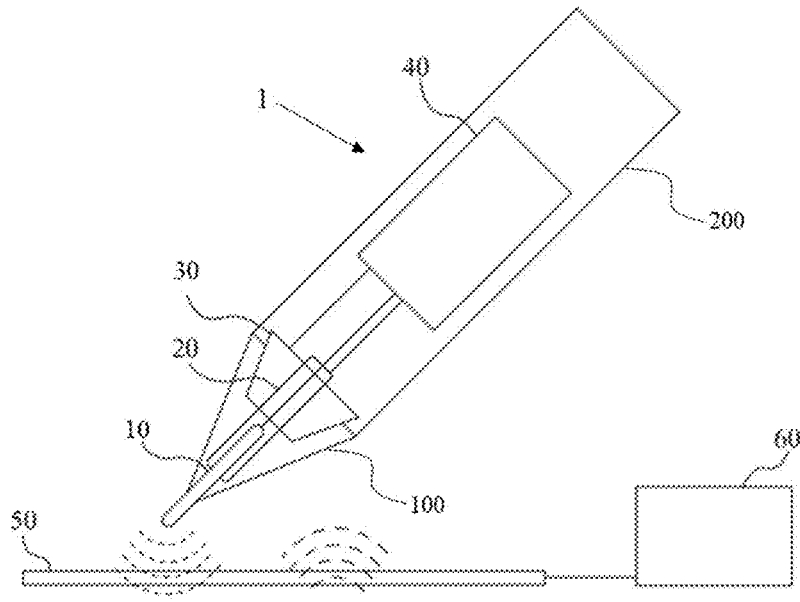
FIG. 3 is a schematic diagram of a structure of a dynamically controlled active stylus according to one embodiment of the present application.

Referring to FIG. 2 and FIG. 3, FIG. 2 is a flow chart of a dynamical stylus control method according to one embodiment of the present application, and FIG. 3 is a schematic diagram of a structure of a dynamically controlled active stylus according to one embodiment of the present application. The active stylus 1 includes a tip electrode 10, a shielding electrode 20, a ring electrode 30, and a dynamic module 40. The tip electrode 10 is positioned at one terminal of the active stylus 1. The shielding electrode 20 surrounds a portion of the tip electrode 10 that is farther from the terminal of the active stylus 1. The ring electrode 30 surrounds a portion of the shielding electrode 20 that is located away from the tip electrode 10. The dynamic module 40 is configured to be connected to at least the shielding electrode 20, and dynamically switches the electrical potential state of the shielding electrode 20 in each frame of the operation of the active stylus 1. In the present application, each frame of the active stylus 1 can be determined according to the transmission protocol between the digitizer 50. Therefore, in the operation state of different protocols, the time at which the dynamic module 40 controls the active pen 1 to be turned on is different. For example, a time length of operating one frame of the active stylus 1 may be between 1 ms and 10 ms, between 10 ms to 16 ms, or between 100 μs and 500 μs. Preferably, for example: 200 μs, 480 μs.

FIG. 3 also shows a digitizer 50 and a touch controller 60 that exchange signals with the active stylus 1. The digitizer 50 may be in the form of a handwriting board, a digital tablet, etc. The touch controller 60 is connected to the digitizer 50 to facilitate the digitizer 50 to sense touch signals.

It should be noted that in the embodiment provided by the present application, the tip electrode 10 and the ring electrode 30 in the active stylus 1 can be used to receive signals from other devices outside the active stylus 1. For example, the active stylus 1 receives a signal through the tip electrode 10 when the active stylus 1 is positioned at a corner of the digitizer 50. The active stylus 1 receives a signal through the ring electrode 30 when the active stylus 1 is located at other positions other than the corner of the digitizer 50. Alternatively, the active stylus 1 receives a signal through the ring electrode 30 when the signal transmitted by the active stylus 1 and the received signal source is better received at a higher altitude. Alternatively, the tip electrode 10, the ring electrode 30, or both the tip electrode 10 and the ring electrode 30 may be utilized to receive the beacon from the digitizer 50, depending on the predetermined purpose, such as gestures or operation status, configured in the active stylus 1.

It is also necessary to explain that, in the present application, the tip electrode 10 is made of a conductive material. In different embodiments, the impedance of the tip electrode 10 ranges from 1 m ohm to 15 m ohm. The relatively high impedance characteristic is employed to prevent a large current from flowing through the tip electrode 10 when the active stylus 1 slides on the digitizer. This helps the active stylus 1 prevent from signal degradation in both signal transmission in the transmission mode TX and signal reception in the reception mode RX, even when the electrical potential state of the shielding electrode 20 switches between the transmitting state and receiving state.

The following description is made using the component symbols of FIG. 3 in conjunction with FIG. 2. However, the active stylus structure for executing the control process of the active stylus dynamically controlled by the present application is not limited to the active stylus 1 disclosed in FIG. 3, and also includes the active stylus 2 disclosed in FIG. 6 and FIG. 7, and other stylus structures having a tip electrode, a shielding electrode and a ring electrode.

Refer to FIG. 2, as shown in FIG. 2, the dynamical stylus control method provided by the present application includes:

Process S1: Reset.

In process S1, the active stylus 1 is reset. Before the active stylus 1 starts to input signals with the digitizer 50, the operating state of the active stylus 1 is reset to prevent the potential change of the frame after the active stylus 1 ends in other previous use states from being retained, which affects the efficacy of operation of the active stylus 1.

Process S2: controlling the active stylus to be in a receiving state.

In process S2, within a frame of operation of the active stylus 1, when the active stylus 1 is in a receiving state, the dynamic module 40 sets the electrical potential state of the shielding electrode 20 to a floating potential FT. In this state, the active stylus 1 is configured to receive an uplink signal from the digitizer 50 to operate synchronously corresponding to each frame of the digitizer 50. The active stylus can receive the uplink signal through the tip electrode 10 or the ring electrode 30 when the active stylus 1 is in the receiving state.

Process S3: Verifying whether the active stylus has received a beacon from outside.

In process S3, when the active stylus 1 has received the beacon, process S4 is entered. If the verification result in process S3 is that the active stylus 1 has not completely received the beacon, process S2 is continued. Through process S3, the timing of the active stylus 1 switching to the receiving state or the transmitting state can be clearly distinguished. Before the processing unit inside the active stylus 1 and the digitizer 50 complete the complete transmission of the uplink signal, the active stylus 1 will continue to maintain the receiving state, to prevent the electrical potential state of the shielding electrode 20 from changing, which in turn causes the active stylus 1 to be unable to completely receive the uplink signal from the digitizer 50, resulting in signal delay or loss.

Process S4: In a same frame in which the active stylus operates, controlling the active stylus to be in a transmitting state. The dynamic module makes the electrical potential state of the shielding electrode be at a ground potential.

In process S4, the active stylus 1 transmits signals such as position and tilt angle to the digitizer 50. In the active stylus 1 with a precisely designed multi-electrode, the tip electrode 10 and the ring electrode 30 in the active stylus 1 simultaneously transmit signals to the digitizer 50. At this time, the signal noise between the tip electrode 10 and the ring electrode 30 and the signal change caused by the change in the projection area of the tip electrode 10 and the ring electrode 30 on the digitizer 50 caused by the active stylus 1 tilting, can be absorbed by the shielding electrode 20 whose electrical potential state is converted to the ground potential GND, thereby improving an accuracy of the signal output by the active stylus 1 to the digitizer 50 in the transmitting state.

Process S5: Verifying whether the frame is completed. If the verification result is that the current frame is ended, the process proceeds to the next frame and executes process S2 in the next frame. If the verification result is that the frame is not ended yet, the process continues to execute process S4.

In process S5, before a frame of the operation state of the active stylus 1 and the digitizer 50 ends, the electrical potential state of the shielding electrode 20 continues to be maintained at the ground potential GND to maintain an accuracy of the signal source transmitted from the active stylus 1 to the digitizer 50 until the same frame ends. After entering the next frame, the active stylus 1 is converted into a receiving state, and at this time, the dynamic module 40 makes the electrical potential state of the shielding electrode 20 to be in a floating potential FT.

Through the process provided by the present application, the active stylus 1 has a transmitting state and a receiving state, and uses the dynamic module 40 to control the electrical potential state of the shielding electrode 20, so that the noise between the tip electrode 10 and the ring electrode 30 is shielded, and the signal transmission accuracy and signal strength of the active stylus 1 can be taken into account, thereby improving the performance of transmitting and receiving signals of the active stylus 1. Moreover, since the shielding electrode 20 of the present application is arranged between the tip electrode 10 and the ring electrode 30 and the electrical potential state can be adjusted according to the signal transmitting state in each frame of the operation of the active stylus 1, even if the tip electrode 10 and the ring electrode 30 are arranged very close to each other, the position, tilt angle and movement trajectory of the active stylus 1 can be accurately and instantly located on the digitizer 50 cooperating therewith.

Figure 4:
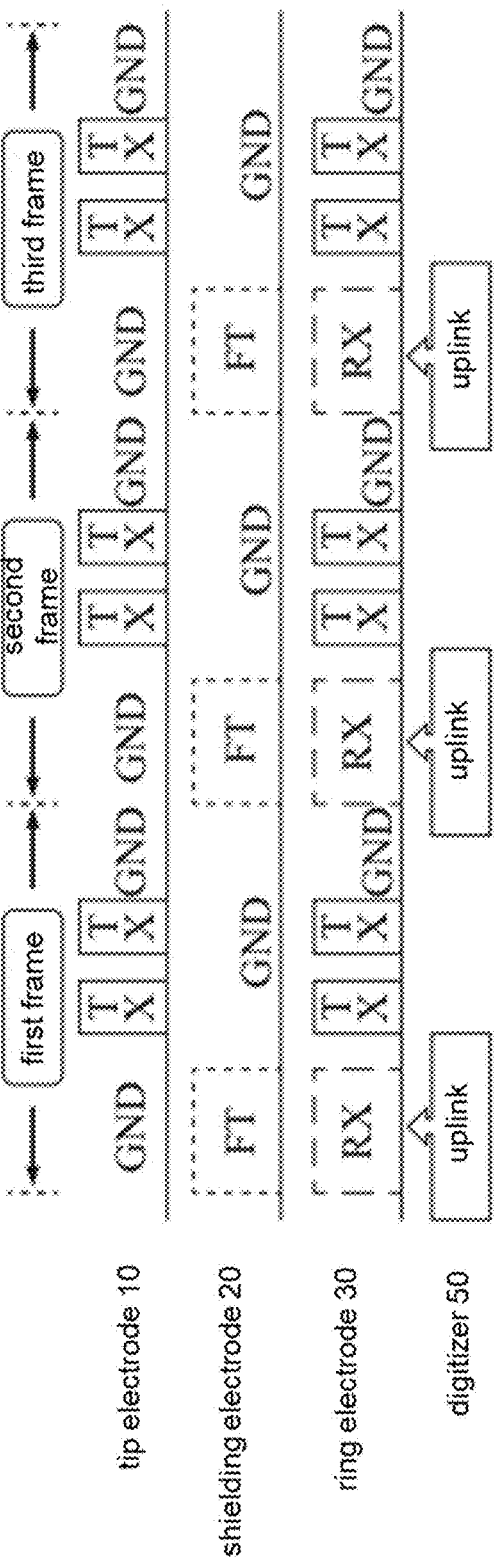
FIG. 4 is a time sequence diagram of an operation of the dynamically controlled active stylus according to one embodiment of the present application.

Referring to FIG. 4, FIG. 4 is a time sequence diagram of the operation of the dynamically controlled active stylus according to one embodiment of the present application, which respectively discloses the electrical potential states of the tip electrode 10, the shielding electrode 20, the ring electrode 30, and the dynamic module 40. In this embodiment, the ring electrode 30 is used as an electrode for the active stylus 1 to receive signals when the active stylus 1 is in a receiving state. When the digitizer 50 outputs a signal to the active stylus 1, the ring electrode 30 is in the receiving mode RX, and the dynamic module 40 controls the electrical potential state of the shielding electrode 20 to be in the floating potential FT, and the electrical potential state of the tip electrode 10 to be in the ground potential GND, to make the signal transmitted to the tip electrode 10 is more likely to spread than the signal transmitted to the shielding electrode 20. When the active stylus 1 has received the beacon from the digitizer 50, the tip electrode 10 and the ring electrode 30 enter the transmission mode TX, and the dynamic module 40 controls the electrical potential state of the shielding electrode 20 to be at the ground potential GND. When the first frame is ended, the digitizer 50 outputs the uplink to the ring electrode 30 again. At this time, the ring electrode 30 returns to the receiving mode RX, the electrical potential state of the tip electrode 10 maintains the ground potential, and the electrical potential state of the shielding electrode 20 maintains the floating potential FT until the active stylus 1 has verified the reception of the beacon from the digitizer 50 in the second frame.

In this embodiment, the dynamic module 40 is configured to control the electrical potential state of the shielding electrode 20 to be converted to the floating potential FT when the active stylus 1 is in the receiving state, and the dynamic module 40 is also connected to the tip electrode 10, the dynamic module 40 controls the tip electrode 10 to be at the ground potential GND. Therefore, the beacon signal outputted by the digitizer 50 to the ring electrode 30 or the tip electrode 10 will not be scattered due to the conduction of the shielding electrode 20, but the signal noise between the tip electrode 10 and the ring electrode 30 can be shielded at the same time, and the signal will not be retained at the tip electrode 10. Therefore, the signal strength received by the active stylus 1 in the receiving state can be enhanced while avoiding signal interference. The dynamic module 40 is used to convert the electrical potential state of the shielding electrode 20 to the ground potential GND when the active stylus 1 is in the transmitting state. Therefore, even if the active stylus 1 is tilted due to different actions, resulting in a larger projection area of the ring electrode 30 and the tip electrode 10 on the digitizer 50, since the electrical potential state of the shielding electrode 20 is in a grounding state, the active stylus 1 can make the signals output by the ring electrode 30 and the tip electrode 10 more concentrated through the shielding electrode 20. Therefore, the digitizer 50 can more accurately locate the position information such as the position and tilt angle of the active pen 1 through the signals output by the ring electrode 30 and the tip electrode 10.

Figure 5:
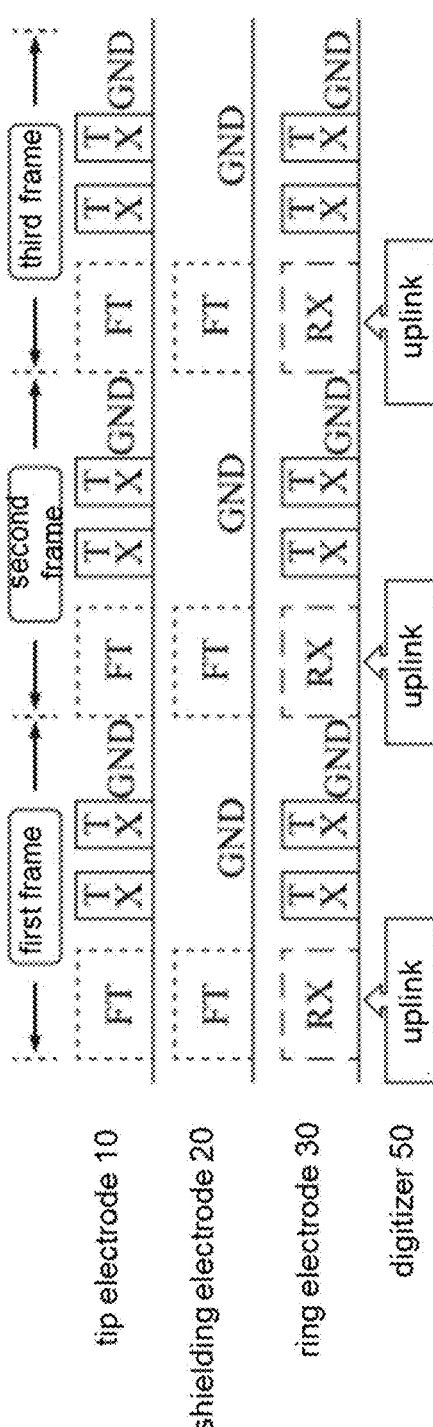
FIG. 5 is a time sequence of the operation of the dynamically controlled active stylus according to another embodiment of the present application.

Next, referring to FIG. 5, FIG. 5 is a time sequence of the operation of the dynamically controlled active stylus according to another embodiment of the present application. In this embodiment, when the active stylus 1 is in the receiving state, the dynamic module 40 converts the electrical potential state of the shielding electrode 20 to the floating potential FT, and the electrical potential state of the tip electrode 10 is also converted to the floating potential FT. Compared with the embodiment disclosed in FIG. 4, an intensity of the signal received by the active stylus 1 in the receiving state in the embodiment disclosed in FIG. 5 is stronger. It should be noted that the dynamic module 40 can switch the active stylus 1 to the active stylus operation time sequence disclosed in FIG. 4 or the active stylus operation time sequence disclosed in FIG. 5 according to different usage scenarios. Therefore, the active stylus provided by the present application can further enhance the receiving state of the active stylus in different frames through the dynamic module 40. In some embodiments provided by the present application, the dynamic module 40 is also connected to the tip electrode 10. The dynamic module 40 controls the electrical potential state of the tip electrode 10 to be in the floating potential FT when the active stylus 1 is in the receiving state.

In addition, FIG. 4 and FIG. 5 are both time sequences of the active stylus receiving signals by the ring electrode 30. However, in the present application, the active stylus 1 can also receive signals through the tip electrode 10. When the active stylus 1 receives a signal through the tip electrode 10, the tip electrode 10 executes the operation time sequence of the ring electrode 30 in FIG. 4 or FIG. 5, and the ring electrode 30 executes the operation time sequence of the tip electrode 10 in FIG. 4 or FIG. 5. That is, the dynamic module 40 controls the electrical potential state of the ring electrode 30 to be in the floating potential FT or a ground potential GND when the active stylus 1 receives a signal with the tip electrode 10 and is in the receiving state.

The second aspect of the present application is described below. Please refer to FIG. 3, FIG. 3 shows a schematic diagram of a dynamically controlled active stylus 1, including: a conical portion 100 including a bottom portion and a top portion. The bottom portion of the conical portion 100 is provide with a larger cross-sectional area than the top portion. A main body 200 is connected to the bottom portion of the conical portion 100. A tip electrode 10 protrudes from inside of the conical portion 100 to be outside of the top portion of the conical portion 100. A shielding electrode 20 surrounds a portion of the tip electrode 10 within the conical portion 100. A ring electrode 30 surrounds a portion of the tip electrode 10 in the conical portion 100, and surrounds a portion of the shielding electrode 20 that is farther away from the tip electrode 10. The active stylus 1 further includes a dynamic module 40 disposed in the active stylus 1 and configured to dynamically switch the electrical potential state of the shielding electrode 20 in each frame of the operation of the active stylus 1. Specifically, the dynamic module 40 controls the electrical potential state of the shielding electrode 20 to be in the floating potential FT when the active stylus 1 is in a receiving state; the active stylus 1 enters a transmitting state when the active stylus 1 receives the beacon, wherein the dynamic module 40 controls the electrical potential state of the shielding electrode 20 to be in a ground potential GND.

In some embodiments provided in the present application, the shielding electrode 20 is longer than the conical portion 100 and a portion thereof enters the main body 200, and the ring electrode 30 surrounds the shielding electrode 20 at a junction of the conical portion 100 and the main body 200. Alternatively, in some embodiments provided in the present application, a length of the shielding electrode 20 does not exceed the conical portion 100, and the ring electrode 30 is disposed in the conical portion 100.

In some embodiments provided in the present application, the dynamic module 40 is disposed in the main body 200 and is respectively connected to the tip electrode 10, the shielding electrode 20, and the ring electrode 30. The tip electrode 10 is controlled by the dynamic module 40 to be in the floating potential FT when the active stylus 1 is in a receiving state, or, in some other embodiments provided in the present application, the tip electrode 10 is controlled by the dynamic module 40 to be in the electrical potential state of the ground potential GND when the active stylus 1 is in a receiving state. Regarding the advantages and characteristics of the tip electrode 10 of the present application being controlled by the dynamic module 40, please refer to the description in the aforementioned relevant paragraphs, which will not be repeated here.

A third aspect of the present application is described below. Please refer to FIG. 6, which shows a schematic diagram of a dynamically controlled active stylus 2 according to another embodiment of the present application, including: a conical portion 100 having a bottom portion and a top portion. The bottom portion of the conical portion 100 has a larger cross-sectional area than the top portion. The main body 200 is connected to the bottom portion of the conical portion 100. A shielding electrode 20A is disposed in the conical portion 100. A tip portion 300 protruding from the conical portion 100 to outside of the top portion of the conical portion 100. The tip portion 300 includes: a tip electrode 10A positioned at a portion of the tip portion 300 away from an end of the conical portion 100. A shielding electrode 20A connected to a portion of the tip electrode 10 away from the end of the conical portion 100; and a ring electrode 30A, surrounding a portion of the shielding electrode 20A farther from the tip electrode 10A. The active stylus 2 further includes a dynamic module 40 configured to switch the electrical potential state of the shielding electrode 20A according to the beacon. The dynamic module 40 controls the electrical potential state of the shielding electrode 20A to be in the floating potential FT when the active stylus 2 is in a receiving state; and the active stylus 2 enters a transmitting state when the active stylus 2 receives a beacon, wherein the dynamic module 40 controls the electrical potential state of the shielding electrode 20A to be in the ground potential GND. In some embodiments provided in the present application, the dynamic module 40 is disposed in the main body and is respectively connected to the tip electrode 10A, the shielding electrode 20A, and the ring electrode 30A.

Figure 7:
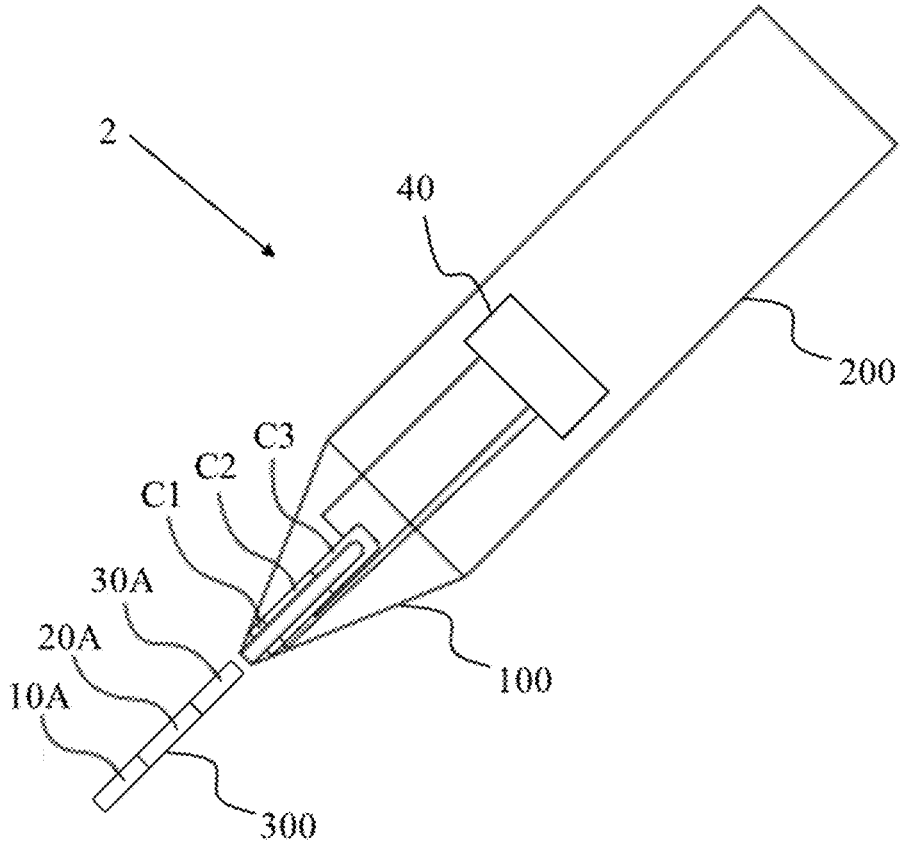
FIG. 7 is a schematic diagram of a separation structure of the dynamically controlled active stylus according to another embodiment of the present application.

Please refer to FIG. 7. In some embodiments provided in the present application, the conical portion further includes a first contact portion C1 for connecting to the tip electrode 10A, a second contact portion C2 for connecting to the shielding electrode 20A, and a third contact portion C3 for connecting to the ring electrode 30A. At this time, the tip portion 300 is detachably inserted into the conical portion 100 and connected to the conical portion 100. When the tip portion 300 is inserted into the conical portion 100, the first contact portion C1 contacts the tip electrode 10A, the second contact portion C2 contacts the shielding electrode 20A, and the third contact portion C3 contacts the ring electrode 30A. The dynamic module 40 controls the tip electrode 10A, the shielding electrode 20A, and the ring electrode 30A through the first contact portion C1, the second contact portion C2, and the third contact portion C3. In this embodiment, the electrical potential state of the tip electrode 10A is controlled by the dynamic module 40 to be at the floating potential FT when the active stylus 2 is in the receiving state. Alternatively, in some embodiments provided in the present application, an electrical potential state of the tip electrode 10A is controlled by the dynamic module 40 to be in the ground potential GND when the active stylus 2 is in the receiving state.

Figure 6:
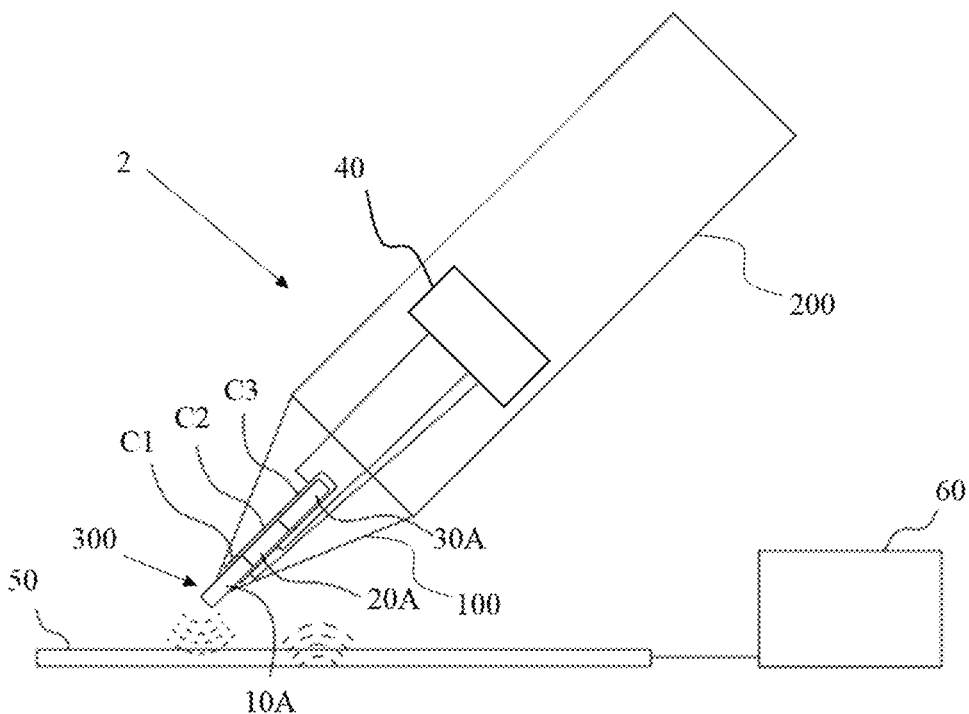
FIG. 6 is a schematic diagram of the structure of the dynamically controlled active stylus according to another embodiment of the present application.

Compared with the other embodiments provided above, the active stylus 2 provided in FIG. 6 and FIG. 7 utilizes the first contact portion C1, the second contact portion C2, and the third contact portion C3 to connect the detachably tip portion 300, in which the tip electrode 10A, the shielding electrode 20A and the ring electrode 30A are all disposed in the tip portion 300, not only simplifies the structure of the active stylus, but also improves the applicability of the active stylus structure. Furthermore, the first contact portion C1, the second contact portion C2, and the third contact portion C3 are used to independently contact different parts of the tip portion 300, which is helpful for analyzing and troubleshooting when the active stylus 2 has operation issues.

It should also be noted that the tip electrode 10A, the shielding electrode 20A and the ring electrode 30A disclosed in FIG. 6 and FIG. 7 are applicable to the tip electrode 10, the shielding electrode 20 and the ring electrode 30 disclosed in FIG. 4 and FIG. 5. The tip electrode 10A and the ring electrode 30A of the active stylus 2 disclosed in FIG. 6 and FIG. 7 can both be used as electrodes for the active stylus 2 to receive signals. When the active stylus 2 receives a signal through the ring electrode 30A, the active stylus 2 executes the operation time sequence of FIG. 4 or FIG. 5. That is, the tip electrode 10A performs the operation time sequence of the tip electrode 10 in FIG. 4, the shielding electrode 20A performs the operation time sequence of the shielding electrode 20 in FIG. 4, and the ring electrode 30A performs the operation time sequence of the ring electrode 30 in FIG. 4; or, the tip electrode 10A performs the operation time sequence of the tip electrode 10 in FIG. 5, the shielding electrode 20A performs the operation time sequence of the shielding electrode 20 in FIG. 5, and the ring electrode 30A performs the operation time sequence of the ring electrode 30 in FIG. 5; or, the active stylus 2 alternately executes the operation time sequences of FIG. 4 and FIG. 5.

When the active stylus 2 receives a signal through the tip electrode 10A, the tip electrode 10A executes the operation time sequence of the ring electrode 30 in FIG. 4 or FIG. 5, and the ring electrode 30A executes the operation time sequence of the tip electrode 10 in FIG. 4 or FIG. 5. That is, the dynamic module 40 controls the electrical potential state of the ring electrode 30A to be in the floating potential FT or the ground potential GND when the active stylus 2 receives a signal with the tip electrode 10A and is in a receiving state.

The present application has at least the following beneficial effects: The present application provides a dynamically controlled active stylus and a control method for the dynamically controlled active stylus, which is provided by setting a shielding electrode between the ring electrode and the tip electrode, and in each frame of the active stylus operation, the control module switches the shielding electrode between the ground potential and the floating potential within a very short time of each frame as the receiving state and the transmitting state of the active stylus are different. The electrical potential state can accurately enhance the positioning ability of the digitizer and the signal receiving ability of the active stylus, while avoiding the technical problem of poor signal receiving of the active stylus caused by too small tip electrode and ring electrode, and also effectively reduces the operational burden of the active stylus. In addition, a variety of different stylus implementation methods are provided to simplify the component structure in the active stylus and improve the detection performance, which is helpful to implement the control method of the dynamically controlled active stylus provided by the present application.

It should be noted that the combination of the various elements in the present application preferably forms the above-mentioned multiple embodiments, but this should not be interpreted as a limitation of the present application. That is, the various elements in the present application can also have more combinations, but not limited to the above-mentioned embodiments.

This specification uses specific examples to illustrate the principles and implementation methods of the present application. The description of the above embodiments is only used to help understand the technical solution and core ideas of the present application. Those skilled in the art should understand that they can still modify the technical solutions described in the above embodiments, or replace some of the technical features therein by equivalents. These modifications or substitutions do not cause the essence of the corresponding technical solutions to deviate from the scope of the technical solutions of the embodiments of the present application.

What is claimed is:

1. A dynamical stylus control method operated through an active stylus, wherein the active stylus comprises a tip electrode, a shielding electrode surrounding a portion of the tip electrode, a ring electrode that is located away from the tip electrode and surrounds a portion of the shielding electrode, and a dynamic module connected to the shielding electrode and configured to dynamically switch an electrical potential state of the shielding electrode, the dynamical stylus control method comprising:

in a frame of operation of the active stylus, controlling the active stylus to be in a receiving state such that the electrical potential state of the shielding electrode is maintained in a floating potential that is not at a ground potential; and in the frame of operation of the active stylus, controlling the active stylus to be in a transmitting state such that the electrical potential state of the shielding electrode is maintained in the ground potential;

wherein the frame of operation corresponds to one operation cycle of the active stylus that includes the receiving state and the transmitting state.

2. The dynamical stylus control method of claim 1, wherein the dynamic module is also connected to the tip electrode, and wherein the dynamic module controls the electrical potential state of the tip electrode to be in the floating potential or the ground potential when the active stylus is in the receiving state.

3. The dynamical stylus control method of claim 1, further comprising resetting the active stylus before the step of controlling the active stylus to be in the receiving state such that the electrical potential state of the shielding electrode is maintained in the floating potential.

4. The dynamical stylus control method of claim 1, further comprising verifying whether the active stylus has received a beacon from outside before the step of controlling the active stylus to be in the transmitting state such that the electrical potential state of the shielding electrode is maintained in the ground potential.

5. The dynamical stylus control method of claim 1, wherein after the step of controlling the active stylus to be in the transmitting state such that the electrical potential state of the shielding electrode is in the ground potential, the method further comprises:

verifying whether the frame of operation of the active stylus is ended;

allowing the active stylus to continue to be in the transmitting state when the frame has not yet ended; and switching the active stylus to the receiving state when the frame is ended.

6. A dynamically-controlled active stylus, comprising:

a main body;

a conical portion comprising a bottom portion and a top portion, wherein the bottom portion is connected to the main body, and wherein the bottom portion is provided with a larger cross-sectional area than the top portion;

a tip electrode protruding from inside of the conical portion to be outside of the top portion of the conical portion;

a shielding electrode surrounding a portion of the tip electrode within the conical portion;

a ring electrode surrounding a portion of the shielding electrode located away from the tip electrode; and a dynamic module disposed in the active stylus, wherein the dynamic module is configured to dynamically switch the electrical potential state of the shielding electrode when the active stylus is in operation;

wherein the dynamic module controls the electrical potential state of the shielding electrode to be in a floating potential that is not at a ground potential when the active stylus is in a receiving state; and wherein the dynamic module controls the electrical potential state of the shielding electrode to be in the ground potential when the active stylus enters a transmitting state.

7. The dynamically-controlled active stylus of claim 6, wherein the dynamic module is disposed in the main body and is connected to the tip electrode, the shielding electrode, and the ring electrode, respectively.

8. The dynamically-controlled active stylus of claim 6, wherein the electrical potential state of the tip electrode is in the floating potential or the ground potential when the active stylus is in the receiving state.

9. A dynamically-controlled active stylus, comprising:

a main body;

a conical portion comprising a bottom portion and a top portion, wherein the bottom portion of the conical portion is provided with a larger cross-sectional area than the top portion, and wherein the bottom portion of the conical portion is connected to the main body; and a tip portion protruding from inside of the conical portion to be outside of the top portion of the conical portion, the pointed end portion comprising:

a tip electrode positioned at the tip portion away from an end of the conical portion;

a shielding electrode connected to a portion of the tip electrode away from the end of the conical portion; and a ring electrode connected to a portion of the shielding electrode away from the tip electrode;

wherein the active stylus further comprises a dynamic module, the dynamic module controls the electrical potential state of the shielding electrode to be in a floating potential that is not at a ground potential when the active stylus is in a receiving state; and wherein the dynamic module controls the electrical potential state of the shielding electrode to be in the ground potential when the active stylus enters a transmitting state.

10. The dynamically-controlled active stylus of claim 9, wherein the dynamic module is disposed in the main body and is connected to the tip electrode, the shielding electrode, and the ring electrode, respectively.

11. The dynamically-controlled active stylus of claim 9, wherein the conical portion further comprises a first contact portion for connecting to the tip electrode, a second contact portion for connecting to the shielding electrode, and a third contact portion for connecting to the ring electrode;

wherein the tip portion can be detachably inserted into the conical portion and connected to the conical portion, and wherein when the tip portion is inserted into the conical portion, the first contact portion contacts the tip electrode, the second contact portion contacts the shielding electrode, and the third contact portion contacts the ring electrode.

12. The dynamically-controlled active stylus of claim 9, wherein the electrical potential state of the tip electrode is in the floating potential or the ground potential when the active stylus is in the receiving state.

\* \* \* \* \*